(12) United States Patent
Smith

(10) Patent No.: US 7,511,403 B2
(45) Date of Patent: Mar. 31, 2009

(54) HIGH-POWERED ACTUATORS AND ACTUATING SYSTEMS FOR EXTENDED RANGE AND PRECISE POSITIONING

(75) Inventor: James Smith, Geneseo, NY (US)

(73) Assignee: Exfo Photonic Solutions Inc, Mississauga, Ontario (CA)

( * ) Notice: Subject to any disclaimer, the term of this patent is extended or adjusted under 35 U.S.C. 154(b) by 129 days.

(21) Appl. No.: 11/370,328

(22) Filed: Mar. 8, 2006

(65) Prior Publication Data

US 2007/0040472 A1    Feb. 22, 2007

Related U.S. Application Data

(60) Provisional application No. 60/659,546, filed on Mar. 8, 2005.

(51) Int. Cl.
*H02N 2/08* (2006.01)
(52) U.S. Cl. .................. 310/317; 310/316; 310/316.02
(58) Field of Classification Search .................. 310/316, 310/317, 323, 316.02
See application file for complete search history.

(56) References Cited

U.S. PATENT DOCUMENTS

| 4,186,437 | A |  | 1/1980 | Cuk |  |
|---|---|---|---|---|---|
| 4,257,087 | A |  | 3/1981 | Cuk |  |
| 4,551,690 | A | * | 11/1985 | Quist | 331/36 L |
| 6,710,646 | B1 | * | 3/2004 | Kimball | 330/10 |
| 2006/0072658 | A1 | * | 4/2006 | Yasuda et al. | 375/238 |

OTHER PUBLICATIONS

"A Conceptually New High-Frequency Switched-Mode Power Amplifier Technique Eliminates Current Ripple", Slobodan Cuk and Robert W. Erickson, Proceedings of Powercon 5, the Fifth National Solid-State Power Conversion Conference, held May 4-6, 1978 in San Francisco, California, Copyright Power Concepts, Inc. 1978.

* cited by examiner

*Primary Examiner*—Darren Schuberg
*Assistant Examiner*—Bryan P Gordon
(74) *Attorney, Agent, or Firm*—Hiscock & Barclay, LLP; Thomas R. FitzGerald, Esq.

(57) ABSTRACT

A piezoelectric motor (PEM) is driven with loosely coupled inductors 24 and switching amplifier having a pulse width modulator 18, gate driver circuit 21 and two pairs of power mosfets 210, 212 and 220, 222. Energy stored in the PEM at the end of one cycle is transferred to a capacitor 202 for use in a subsequent cycle.

7 Claims, 5 Drawing Sheets

HIGH-POWERED ACTUATORS AND ACTUATING SYSTEMS FOR EXTENDED RANGE AND PRECISE POSITIONING

CROSS-REFERENCE TO RELATED APPLICATIONS

This application claims the benefit of the priority date of U.S. Provisional Patent Application Ser. No. 60/659,546 filed Mar. 8, 2005.

This invention was made with Government support under Contract No. F29601-00-C-0179 awarded by the U.S. Air Force. The government has certain rights in the invention.

BACKGROUND

Inchworm® motor systems are used in many application to precisely position components of mechanical and optical systems. One application is for precisely positioning reflective mirrors of telescopes deployed by satellites and another for® positioning mirrors or lenses in terrestrial telescopes. For example, a typical satellite telescope system may comprises multiple mirrors that are folded at launch and are deployed in outer space. It is critical that the deployed mirrors be finely adjusted to precise location along the optical axis of the telescope. Inchworm® motor control systems can precisely position the mirrors to within nanometers of a desired position. Such Inchworm® motors may also compensate for atmospheric affects on terrestrial telescopes. The Inchworm® motor may be coupled to an atmospheric sensing system that detects perturbations produced by the atmosphere. The Inchworm® motor will operate as part of a high speed closed loop control system to make nanometeric adjustments to the telescope's mirrors and thereby correct the apparent atmospheric perturbations The problem encountered is to design a system with tight tolerances that needs little alignment after deploying (attempting to mimic a monolithic system) or a system utilizing a positioning system that accommodates a wide range of adjustment with nanometer control resolution. The positioning needs are several. First, after deployment, the optical elements need to be positioned relative to each other in the range of the wavelengths of interest. If an optical element is segmented, each segment needs to be at the same phase of the wavefront. Second, while in operation there will be thermal excursions of the whole system or of some parts of the system. This will cause differential movement of the optical elements. Third, the articulated low mass optical elements will be considerably less stiff than a monolithic design. This will cause differential movement as a function of force applied to and the stiffness of the particular load path. The forces will change as a function of movement for targeting. Fourth, dynamic correction of the optical elements (adaptive optics) for atmospheric or other perturbations is a lower travel range but higher frequency need.

Another application area is large laser-based systems. The large optical elements need alignment in the 10-nm range with forces exceeding 100 $N^3$. As before, designs can go to elaborate lengths to isolate system movements or they can accommodate the inevitable changes with active position control. To date, the alignment systems utilize a serial approach with one technology for coarse adjustment and a different technology for precision adjustment. While land-based systems can accommodate the larger volume and mass of dual positioning systems, this approach does impact overall system size. Secondly, dual-positioning systems require another level of control software to manage and trade-off control between the systems. A single actuator with stiffness of 25 N/µm probably exceeds any serial design capability. Conceivably having the capability to remotely compensate for 10+ millimeters of change would lessen sub-system tolerances, setup procedure complexity, operational downtime and subsequent costs.

Inchworm® motors and their control systems are prime candidates for achieving the gross and fine positioning requirements in a single motor system. However, prior motor drives rely upon conventional Class A linear amplifiers to provide the energy for operating the motors. Inchworm® motors typically translate a load forward or reverse along a given path. Conventional motor drives contain linear amplifiers to power the motor. The Inchworm® motor is mostly a capacitive load. As such, it must be charged to move in one direction and discharged to move in the other direction.

Linear power supplies are notoriously inefficient. They typically include Class A amplifiers that consume power whenever they are turned on even if the motor is quiescent. They have other drawbacks, including a large number of components and relatively high power consumption. Since low mass and low power consumption are primary considerations for satellite components, those skilled in the art are looking for a more efficient amplifier that has few components and less mass.

One attractive candidate is switching power amplifiers also known as class D amplifiers. These components are more efficient than a typical Class A circuit. Some achieve efficiencies at or above 90%. However, a typical boost or buck converter has other problems. For one, the operating frequency is normally quite high if one has to avoid interference with the switching frequency. Also, a typical boost or buck converter has relatively large ripple currents that detract from the precise voltage supply needed to operate the sensitive Inchworm® motors. As such, there is an unmet need for an efficient, low mass power amplifier that can operate Inchworm® motors.

SUMMARY

The invention provides an Inchworm® motor and motor control system that is almost three times as efficient as a linear amplifier. The invention relies upon a Cuk converter that generates virtually no ripple in the output power. The control system is a four quadrant system that connects two Cuk converters across the capacitive load of the Inchworm® motor. When the motor is released from one extended position and driven in the opposite direction, the energy stored in the motor is transferred to a capacitor where it may be used when the motor is moved again. The Cuk converters have loosely coupled inductors for achieving minimum ripple. The two Cuk converters are disposed on opposite sides of the motor for differentially operating the motor. Cuk converters are named for a key researcher, Slobodan Cuk. He is the author of numerous papers on the subject of capacitive power transfer. His work is also described in Powercon 5, the Fifth National Solid-State Power Conversion Conference held May 4-6. 1978 where he and Mr. Robert Erickson co-authored a paper entitled *A Conceptually new High-Frequency Switched-Mode Power Amplifier Technique Eliminates Current Ripple*, whose entire contents is hereby incorporated by reference together with the entire contents of U.S. Pat. Nos. 4,186,437 and 4,257,087.

One advantage of the Cuk converters that power is capacitive coupled to and from the load. In the Inchworm® motor the load itself is capacitive so that energy used to move the motor may be partially recaptured by a storage capacitor. The front end of the Cuk converter has is a typical switching power supply circuit that includes a ramp generator, a pulse width modulator for receiving the ramp and the sum of a control and feedback signal. The pulse width modulator feeds a delay line, a dead time logic control circuit, a gate driver (level shifter) circuit and a power mosfet circuit. The power mosfet circuit includes two pairs of complementary nmos and pmos field effect transistors. The mosfets in turn are coupled to pairs of loosely coupled inductors. The inductors have a turns ratio set to a low coupling coefficient, approximately 0.80-0.85. A negative 175 volt power source is selectively connected through the Cuk converters to supply between +300 and −150 volts to the Inchworm® motor. The Inchworm® motor has two clamps, one on each end, and center section. The clamps and center section are piezoelectric elements and each is driven by its own pair of Cuk converters, loosely couple inductors and power mosfets.

The invention provides a single small actuation system that provides high resolution step size of 2 nanometers over a range of 20 mm travel with forces as high as 100 Newtons average and up to 180 Newtons at peak performance.

DRAWINGS

DETAILED DESCRIPTION

Figure 1:
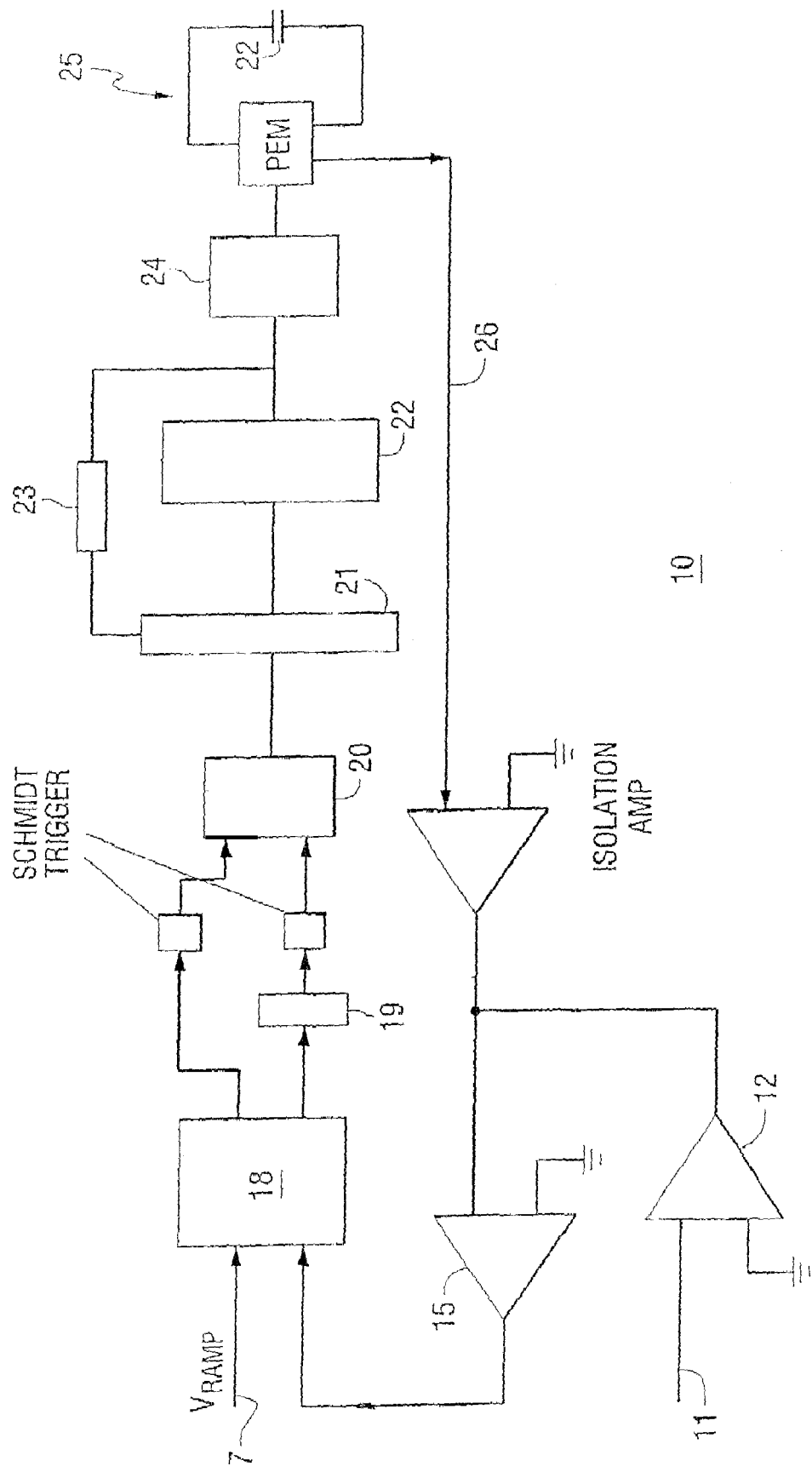
FIG. 1 is a block diagram of an actuator and an actuator drive system.

Turing to FIG. 1, there is shown a general circuit diagram of the motor driver system 10. The system 10 includes a switching amplifier for driving a piezoelectric linear motor 25 using loosely coupled inductors 24. The system 10 is a four quadrant control system that controls the motor 25 when the voltage is positive or negative and when the current flows in either direction. The switching amplifier converts a dc voltage from one level to another by varying the duty cycle of the switching amplifier.

A ramp generator (not shown) provides a triangular ramp signal Vamp to one input 17 of pulse width modulator (PWM) 18. The other input 18 receives a summing output signal of amplifier 15 that sums one of the input control signals 11, 12 with a feedback signal 26 from the output of the system 10. The output of PWM 18 is coupled to delay line 19 which is in turn connected to dead time logic DTC circuit 20. The dead time logic circuit includes a series of logic gates that eliminates the unwanted simultaneous operation of the fets. A pair of Schmidt trigger circuits, one directly from the PWM and one through the delay, are input to the DTC 20. The output of the DTC 20 is connected to the input of the gate driver circuit 21. The gate driver circuit 21 receives the input control signals for the gates of the mosfet switching transistors and raises their voltage to a level sufficient to control the gates. The output of the gate driver circuit is coupled to the power driver circuit 22. The power driver circuit comprises two switches and each switch has two complimentary power mosfets. The switches operate to connect power from a high voltage power supply (not shown) to the loosely coupled inductors 24 and the PEM 25. The mosfets are arranged as a pair of amplifier circuits. One pair of mosfets 210, 212 drives the PEM 25 positive and the other pair 220, 222 is one hundred eighty degrees out of phase and drives the PEM 25 negative. As energy is transferred out of the PEM 25, it is stored in capacitor 202 until the applied voltage reverses polarity. In this way the system stores some of the energy used to charge or discharge the PEM 25 and that stored energy is available for the next charge or discharge operation. Since the PEM 25 is normally operated by alternately charging and discharging the piezoelectric material, the resulting system conserves power. This is a critical consideration in many uses of the invention, such as satellites, where mass and power consumption is key criteria. The invention improves power performance by about 300% when compared to a conventional linear amplifier. In addition, the invention uses fewer components to achieve the same results as linear amplifiers to that the mass of the motor system is likewise reduced.

The loosely coupled inductors 24 are disposed between the power mosfets 22 and the PEM 25. An over current protection circuit (OPC) 23 is coupled between the output of mosfets and the gate driver circuit 21. If OPC 23 detects a current that could harm the mosfets of the PEM 25, the OPC opens one or more of the gate drivers to protect the mosfets 22, the inductors 24 and the PEM 25 from destructive current.

Figure 2:
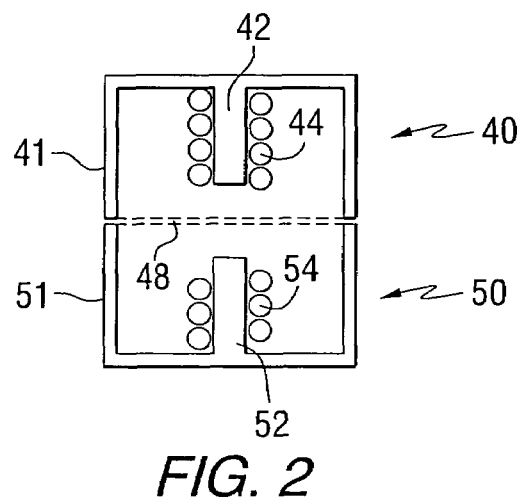
FIG. 2 is a section elevation view of a spit bobbin with loosely coupled inductors.
Figure 3:
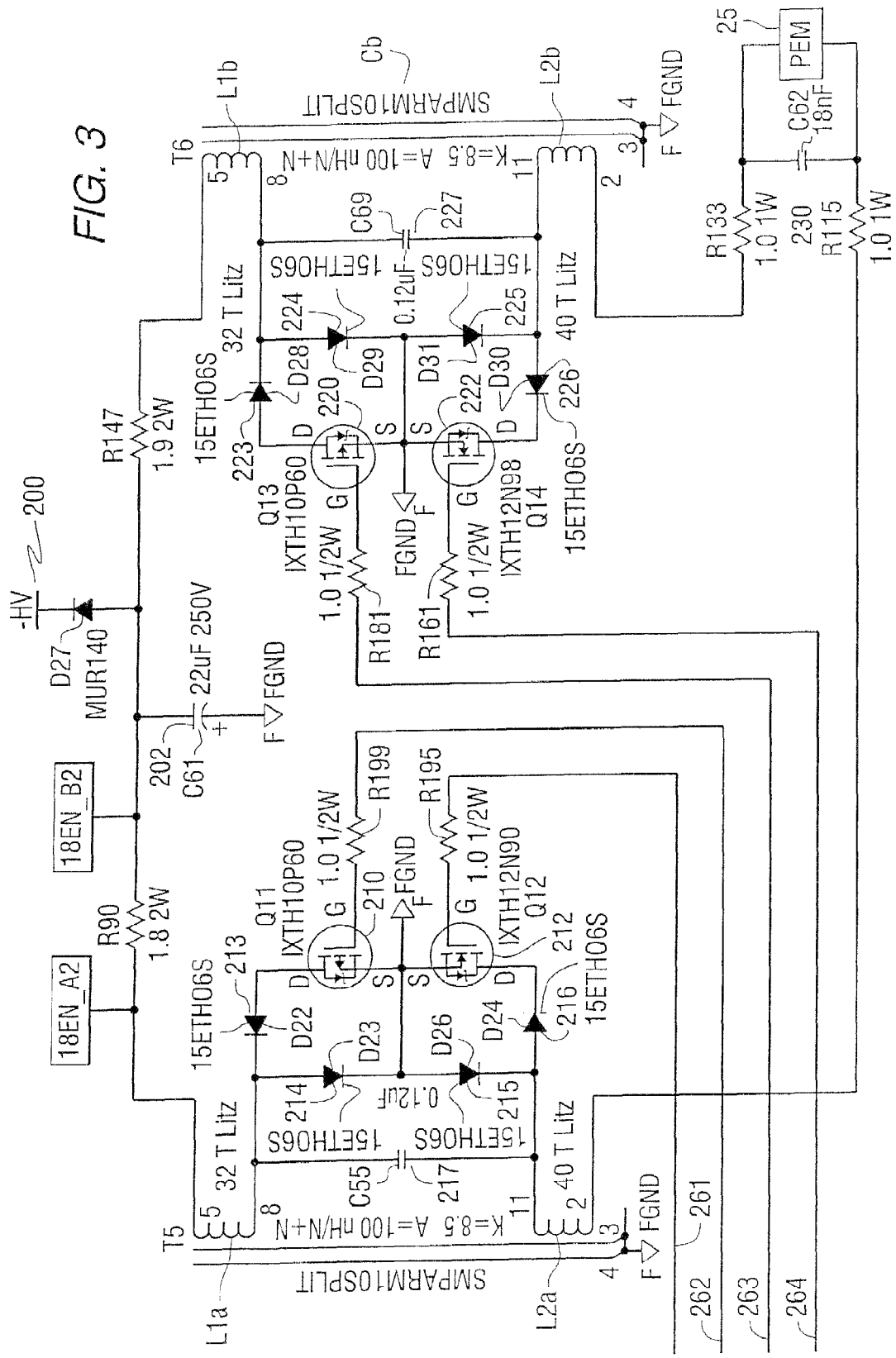
FIG. 3 is a schematic diagram of the power conversion circuit and actuator.

Turning to FIG. 3, there is shown a detailed schematic of the power mosfets circuit 22 and the loosely coupled inductors 24 that comprises the Cuk driver circuits for the PEM 25. One pair of inductors comprises L1a and L2a. They are loosely coupled together on a split bobbin as shown more fully in FIG. 2. Primary inductor L1a has 32 turns and secondary inductor L2a has 40 turns. The coupling coefficient is 0.8 and that matches the turns ratio.

Mosfets 210 and 212 are complementary pmos and nmos fets. Gate controls signals 261, 262 are coupled to the gates of mosfets 210, 212, respectively. The drain of mosfet 210 is connected to diode 213 and the drain of mosfet 212 is connected to diode 216. Diodes 214 and 215 are connected across the terminal windings of the inductors L1a, L2a. A power exchange capacitor 217 is also connected across the terminal windings. The sources of the mosfets 210, 212 are connected together and to ground. Mosfets 220 and 222 are also complementary pmos and nmos fets. Gate controls signals 263, 264 to the gates of mosfets 220 and 222, respectively. The drain of mosfet 220 is connected to diode 223 and the drain of mosfet 220 is connected to diode 226. Diodes 224 and 225 are connected across the terminal windings of the inductors L1b, L2b. A power exchange capacitor 227 is also connected across the terminal windings. The sources of the mosfets 220, 222 are connected together and to ground. All the mosfets are referenced to ground. This enables the system to operate with a single power supply, reduces the need for a conventional high side driver, and enable four quadrant operation so that and power may flow in either direction, to and from the PEM 25. When power flows out of the PEM 25, it is stored in capacitor 202. When the PEM is reversed, the power stored in capacitor 202 flows back into PEM 25, thereby improving the overall efficiency of the system.

A negative high voltage power supply 200, typically −175 volts, is coupled to the initial windings of inductors L1a, L1b. A storage capacitor 202 is coupled between the power supply 200 and ground. The terminal windings L2a, L2b are connected across the PEM 25 and a load capacitor 230 is also across the PEM 25.

Inductors L1a, L1b and L2a, L2b of each of the two converters are coupled as shown with a matching condition n=k where n is the square root of the ratio of self-inductances L1 and L2 the respective input and output inductors, and k is the coupling coefficient. Under those matching conditions, the output current ripple across the PEM 25 is minimized and almost zero, thereby tremendously improving the amplifier performance because there is no longer any need for excessively high switching frequencies to reduce the amplifier switching ripple at the output. Any ripple will be shifted to the input currents of the inductors and the current drawn from the power source 200 will also be DC only, thus approaching the ideal dc-to-dc power stage characteristic in having DC currents at both input and output.

When the pair of loosely coupled inductors satisfies the matching condition, zero current ripple is obtained at the output and the need for output filter capacitors $C_2$ is completely eliminated. The elimination of output filter capacitors results in further simplified and extremely favorable loop-gain dynamics (effectively single pole frequency response, as will be shown later) which permits closing the feedback loop directly, even without any compensation network, and yet resulting in a high degree of stability. Also there is no longer any need for an excessively high switching frequency to reduce the amplifier ripple, thus resulting in further improvement. Therefore, the closed-loop switching amplifier configuration of FIG. 3 has a number of advantages which will become even more evident by comparison with the conventional buck type converters.

The PEM 25 is a piezoelectric motor element. A typical Inchworm® motor has three such elements including two clamps and a center extendible and retractable section. The operation of the elements together to perform Inchworm® motor function is described later. The following example is given to describe the circuit operation of one such element. Those skilled in the art understand that the each element has its own switching amplifier driver and the description of one combination of switching amplifier and PEM 25 will be the same for the others.

Each PEM 25 is a capacitor that is charge positively or negatively. As such, the switching amplifier must be able to apply both polarities of voltage at various magnitudes in order to operate the PEMs 25. In the preferred embodiment the PEMs 25 operate between +300 volts and −150 volts. In other words, the switching amplifier must charge the PEM 25 to as high as +300 volts and discharge the PEM 25 to as low as −150 volts.

Figure 4A:
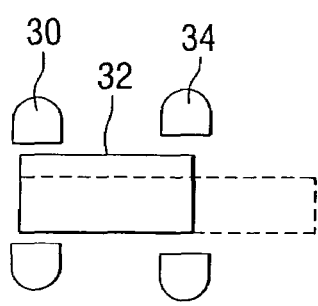
FIGS. 4a-4c shows sequential steps in the actuator movement.
Figure 4B:
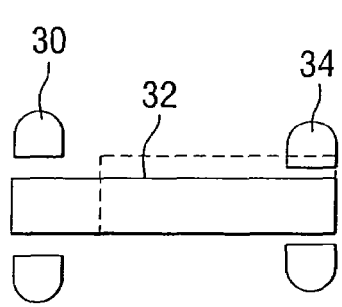
Figure 4C:
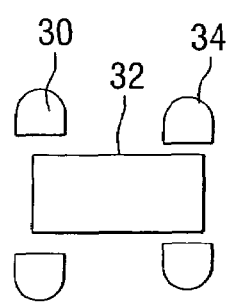

Turning to FIGS. 4a-4c, they show sequential positions of a piezoelectric Inchworm® motor that comprises three piezoelectric elements. The motor has a first clamp 30, and center section 32, and a second clamp 34. The clamps 30, 34 are located on opposite ends of the center section 30. Each component 30, 32, 34 is made of piezoelectric material. The clamps 30, 34 have an annular shape. The center section 32 is disposed with one end in the opening of one clamp and the other end in the opening of the other clamp. The annuli of the clamps shrink or expand, depending upon the applied polarity and magnitude of voltage. The center section 32 elongates or retracts, also depending upon the applied polarity and voltage.

Each piezoelectric element is mostly a capacitive load. For an applied, positive voltage, the material expands. In the case of the clamps 30, 34, the annuli expand when positively charged and thereby clamp onto one end of the center section 32. The center section expands in a linear direction. When a negative polarity voltage is applied, the piezoelectric material shrinks. Thus a negative polarity voltage may open a clamp 30, 34 and shrink or retract the center section 32. Those skilled in the art understand that in order to extend the center section 32, the clamp 30 is shrunk to hold one end of center section 32, the clamp 34 is opened to allow the center section 32 to expand. In operation, a negative voltage is applied to clamp 30 (close), a positive voltage is applied to clamp 34 (open), and a positive voltage is applied to center section 32 (extend). See FIG. 4a for the foregoing. After reaching its limit the motor may be further advanced by clamping the leading end, releasing the trailing end, and shrinking the center section. As shown in FIG. 4b, the clamp 34 is closed by applying a negative voltage, the clamp 30 is opened or released by applying a positive voltage and the center section 32 shrinks or retracts toward clamp 34 by applying a negative voltage. By suitably applying the proper polarity and magnitude of voltage to the clamps 30, 34 and the center section 32, the motor 25 may by moved forward or backward with extreme precision. The elements 30, 32, 34 will remain in their last state of extension or retraction until a positive or negative voltage is applied.

Each actuator is approximately 4" long and ¾" diameter. The actuator is mounted on its long base with the shafts protruding from each end. The shafts are split to allow the clamps piezoelectric elements to be mounted between them. The clamping (normal) force is provided by a leaf spring forcing the twin-finned flexure onto the shaft. Energizing either clamp pushes the flexure against the spring and releases the clamping force. Power-off hold is the unenergized state. The friction is a function of the clamping interface materials. In one configuration silver pads (or other suitable soft material) contact the silicon carbide shaft, a hard material. The pads are above and below the shaft providing two interfaces or friction multipliers. The shaft design, not shown, consists of two silicon carbide dual shafts mounted inline to a flexure holding the extension piezoelectric element. The flexure compressively preloads the piezoelectric element enhancing its output and reliability. Since the shaft assembly moves, silicon carbide was chosen for its very high stiffness to mass ratio. The shaft experiences significant momentum change as it extends and retracts so low mass is attractive. At nanometer-level precision, high stiffness is critical to not changing position as the load changes.

Turning to FIG. 2, there is shown a pair of loosely coupled inductors. In a typical pair 40, 50, the coils 44, 54 of wire are wound on separate cores 42, 50 that extend from the bodies 41, 51 of split bobbins. There is an air gap 48 between the two inductors 40, 50. The size of the air gap and the turns ration of the windings 44, 54 are selected to provide a coupling between 0.8 and 0.85. In the preferred embodiment the turns ratio is 32 (primary) to 40 (secondary), or about 4:5. The large air gap keeps the cores 42, 52 from saturating.

The power supply is typically −175 volts. By changing the duty cycle of the switching amplifier, the system may generate between −175 volts and +175 volts.

A primary feature of the invention is its improved amplifier efficiency in driving piezoelectric-based (capacitive) devices. Most conventional amplifiers, including the commercial Inchworm® motors, are based on a Class A linear amplifier design. It is a simple, reliable approach but has minimal efficiency. To energize the piezoelectric element, a quantity of charge (electrons) flows from the amplifier to the PEM 25 as current. Upon de-energizing, the charge is returned to the amplifier. Along the way some of this current is consumed in transmission losses, work and piezoelectric dissipation loss. In addition, a certain amount of power is consumed in the amplifier in an idle state (no output) that is called quiescent loss. The power being returned to the amplifier is called reactive power. Simplistically the amplifier must deal with this returning reactive power.

In a Class A linear amplifier reactive power is dumped as heat. In contrast, the invention uses a Class D switching design that allows some of the returning electrons (current, power) to be recycled so less energy is dumped as heat. Consequently lower total input power is needed to operate the actuators and less heat has to be managed in the electronics.

Figure 5:
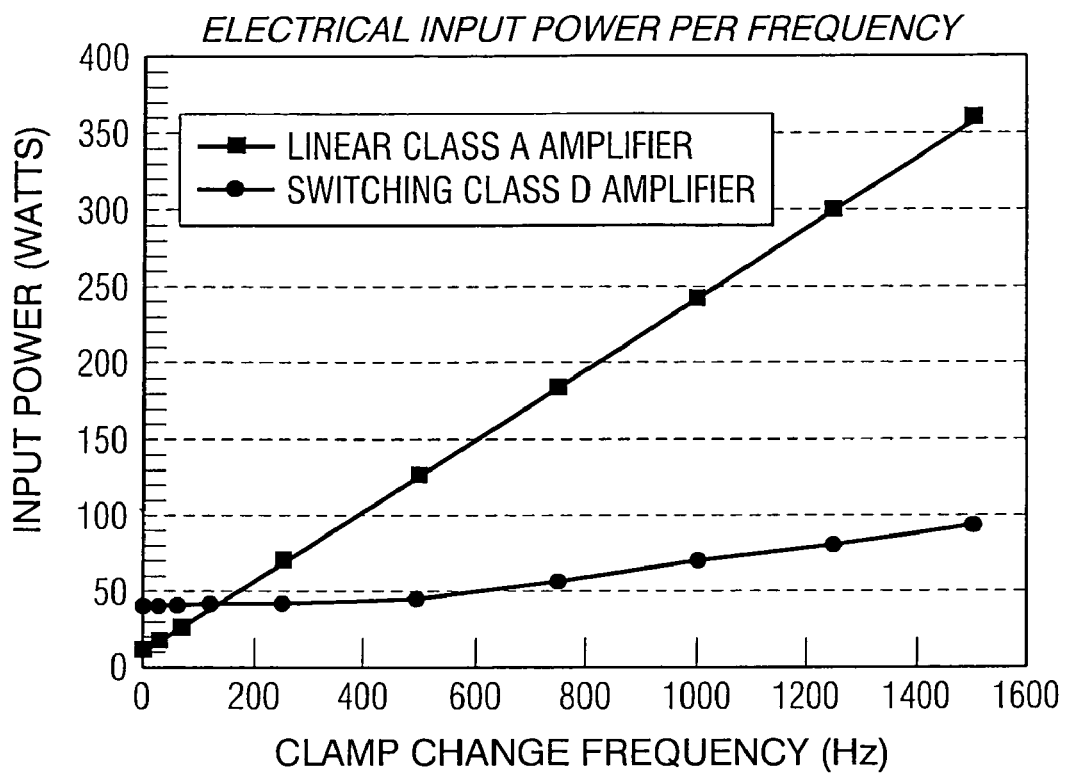
FIG. 5 is a graph comparing power outputs of Class A and Class D power converters.

For comparative purposes, I chose a 1000 Hz clamp change frequency as the design target. Actuator top speeds would be about 25 mm/s. FIG. 5 compares electrical power supplied to the two amplifiers to the clamp change frequency produced. Losses outside the amplifiers are identical in this comparison. The Class A curve is approximately linear and dissipates nearly all of the input power as heat. It has a quiescent load of about 10 W at zero output power. The Class D curve starts at a higher quiescent power of 39 W but it has a much lower slope. Considerably less input power is needed because much of the returned reactive power is being reused. Consequently less power is being dissipated as heat. At the design peak of 1 kHz clamp change frequency, the difference in input power required is 3.5× less for the Class D design.

Figure 6:
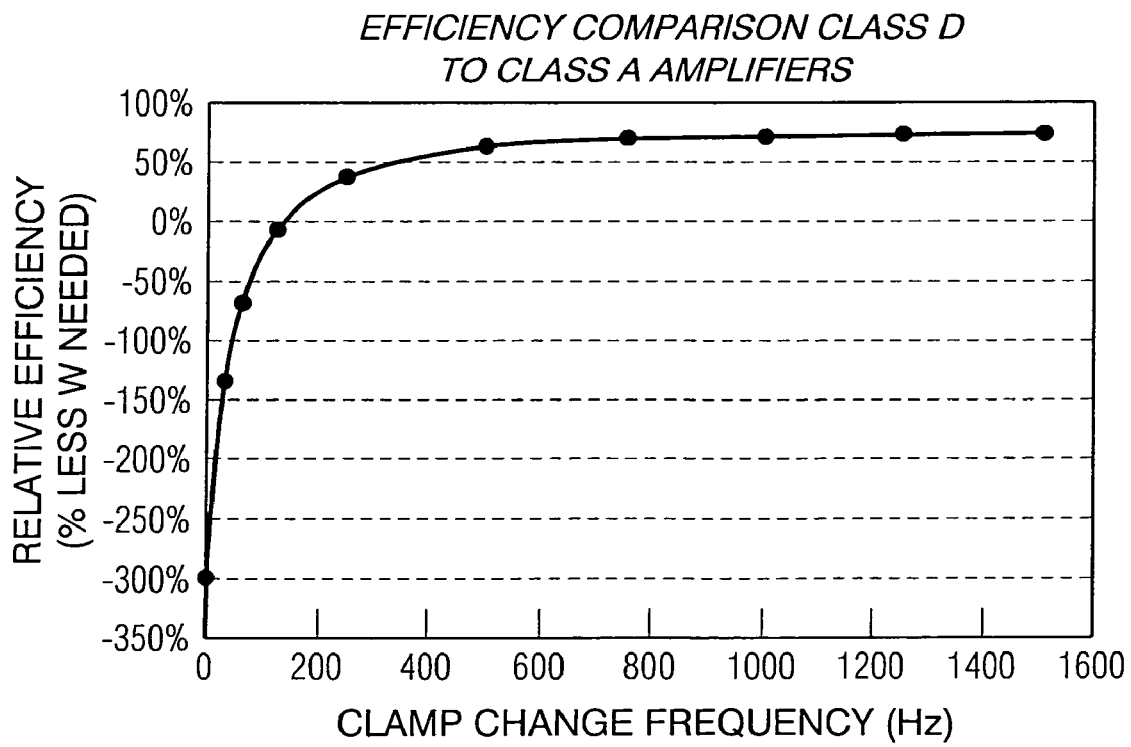
FIG. 6 is a graph comparing relative efficiencies of the Class A and Class D power converters.

Efficiency is a comparison of the power needed for each system. At greater than 3 mm/s [120 Hz clamp changes] the new Class D amplifier circuit needs less power than the Class A linear circuit to deliver the same actuator performance (FIG. 6). At 1 kHz clamp change frequency the Class D needs only 30% as much power as Class A amplifier circuit.

Test data represents the total load of 1100 nF on 100% duty cycle or a constantly moving actuator. Real operation rarely is 100% duty cycle. At high speeds the new amplifier obviously is much more efficient. However, when not moving, zero output power, the Class D design uses 29 W more that the Class A design. The break-even point is about 120 Hz or 3 mm/s. The real benefit of this system may not be the total watts consumed over a mission cycle but that a much lower peak power capability is needed to support high-speed operation. In this example only 75 W input is needed for Class D compared to 225 W needed if a Class A design were used to produce 25 mm/s speeds.

Figure 7:
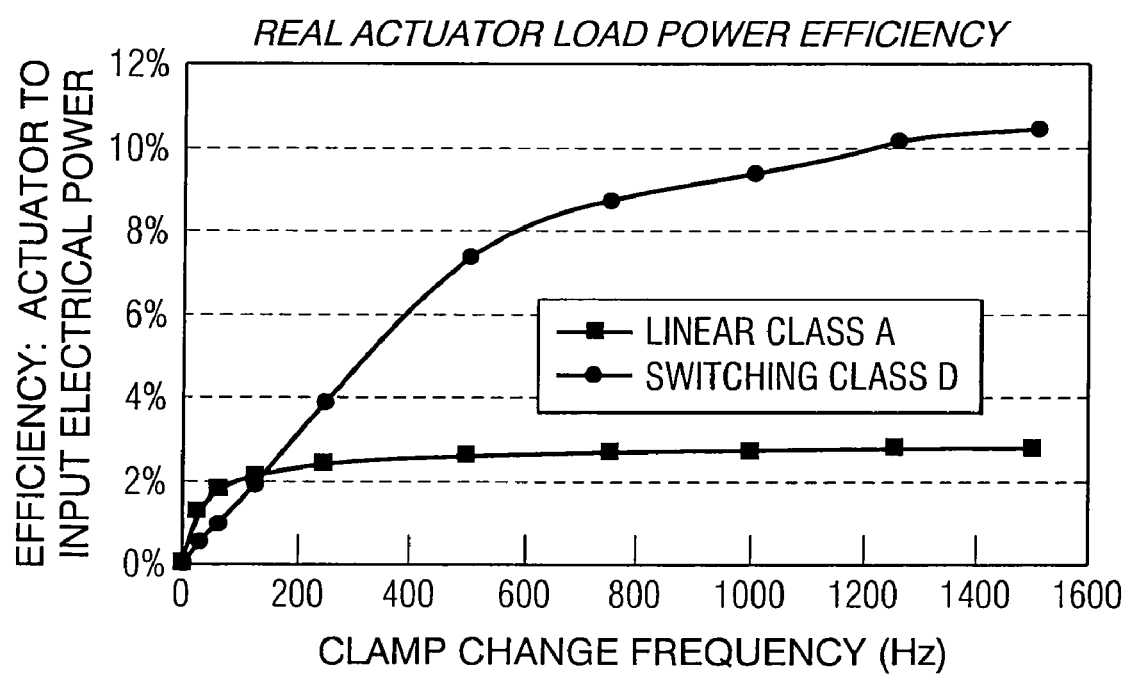
FIG. 7 is a graph comparing efficiency to frequency for Class A and Class D power amplifiers.

FIG. 7 illustrates the efficiency of converting electrical power to the real power (mechanical power and tangent loss) at the actuator. The Class A linear design has a conversion rate of barely more than 2%. With the new Class D design the efficiency improves 3.5× at the 1 kHz design target. Real Power Efficiency continues to climb at higher speeds (frequency).

The amplifier "specifications" are noted in Table 4. They must address the parameters needed to amplify the input waveforms. Simplistically, the clamp waveforms are periodic square-wave with half-sinusoidal ramps and the extension is periodic trapezoidal shape. The loads are 700 nF for the extension piezoelectric element and 200 nF each for the clamping piezoelectric elements. Key parameters are:

- Slew rate that is limited by the amplifier current output capability as the voltage changes
- Power bandwidth
- Small signal bandwidth to reproduce the original waveform shape details
- Voltage range which drives the piezoelectric element stress-strain change

TABLE 4

New Class D Switching Amplifier Performance Data

| Parameter | Performance 700 nF load | Performance 200 nF load |
| --- | --- | --- |
| Total voltage range | 450 V | 450 V |
| Total current range, measured at max. slew rate | 4.9 A | 4.4 A |
| Slew rate | 7 V/µs | 22 V/µs |
| Power bandwidth | 4 kHz | 20 kHz |
| Small signal bandwidth | 20 kHz | 70 kHz |
| Delay | 36 µs | 18 µs |

The invention claimed is:

1. A motor driver system comprising:
 a piezoelectric linear motor having a substantial capacitive load and capable of moving in either of first and second, opposite directions;
 a first pair of loosely coupled inductors having their output connected to the piezoelectric motor for driving said motor in one direction;
 a second pair of loosely coupled inductors having their output connected to the piezoelectric motor for driving said motor in the opposite direction;
 a storage capacitor connected between the pairs of loosely coupled inductors storing energy from the loosely coupled inductors;
 an output capacitor connected across the piezoelectric motor to apply energy from the loosely coupled inductors to the piezoelectric motor;
 a first pair of switches connected between the first pair of loosely coupled inductors and the piezoelectric motor and operable for driving the piezoelectric motor in said first direction;
 a second pair of switches connected between the second pair of loosely coupled inductors and the piezoelectric motor and operable for driving the piezoelectric motor in said second and opposite direction.

2. The motor driver system of claim 1 wherein the loosely coupled inductors provide substantially ripple free current to the motor.

3. The motor driver system of claim 1 wherein the turns of the pairs of inductors are not identical and the cores of the inductors are separated from each other by a suitable air gap to loosely couple one inductor to the other.

4. The motor driver system of claim 1 wherein the ratio of the turns of the inductors is 4:5.

5. A motor actuation system comprising:
 a piezoelectric motor with a capacitive load:
 a motor driver circuit connected to the motor, said motor driver circuit comprising first and second complementary mosfets coupled between first and second inductors;
 third and fourth complementary mosfets coupled between third and fourth inductors;
 an energy storage capacitor coupled between the first and third inductors;
 an output capacitor coupled to the second and fourth capacitors;
 a pulse width modulator; and
 a gate control circuit coupled between the pulse width modulator and the gates of the mosfets for selectively turning the mosfets on and off to drive the piezoelectric motor in opposite directions.

6. The motor actuation system of claim 5 wherein the turns of the pairs of inductors are not identical and the cores of the inductors are separated from each other by a suitable air gap to loosely couple one inductor to the other.

7. The motor actuation system of claim 5 wherein the ratio of the turns of the inductors is 4:5.

* * * * *